UNITED STATES PATENT OFFICE.

EDWARD WEINGÄRTNER, OF ENGLEWOOD, NEW JERSEY, ASSIGNOR TO THE ARABOL MANUFACTURING COMPANY, OF NEW YORK, N. Y., A CORPORATION OF NEW YORK.

LAUNDRY STARCH.

984,330. Specification of Letters Patent. Patented Feb. 14, 1911.

No Drawing. Application filed June 25, 1908. Serial No. 440,259.

*To all whom it may concern:*

Be it known that I, EDWARD WEINGÄRTNER, a naturalized citizen of the United States, and a resident of Englewood, in the county of Bergen and State of New Jersey, have invented certain new and useful Improvements in Laundry Starches, of which the following is a specification.

My invention relates to a process for treating starches, and to the product resulting therefrom; and it has for its object to render the cheaper starches such as corn and potato starch more penetrating, so that they may be more efficient and suitable for use in households and steam laundries for starching fabrics such as linen and the like.

It is well known that wheat starch possesses certain penetrating qualities which make it best adapted for laundrying purposes. Wheat starch, however, is relatively high priced commanding approximately double the price of corn starch in the United States and of potato starch in Germany. In using the two latter starches, as ordinarily furnished, it is found that they do not penetrate as does the wheat starch; and are likely to remain on the surface of laundried collars, cuffs and shirts, combining only with the outer layer of the three or four layers of fabric from which the aforementioned articles are built up and thus cause blistering of the same. Now I have found that in treating the starch, as by mixing corn or potato starch in the dry state with salts of sulfonated fatty acids, or esters of the sulfonated fatty acids, as for example with sulfonated oils, a product is obtained which has the valuable penetrating qualities of a high priced wheat starch, and can be used in precisely the same manner.

I combine the ingredients by weight in substantially the proportions stated, viz:—dry starch (corn, potato or other low priced starch) 100 parts, Turkey red oil 2 parts. These ingredients are to be thoroughly mingled by agitation and stirring, the Turkey red oil acting, so to say, as a lubricant, enveloping and separating the starch grains and preventing lumping while the starch is being cooked. Starch treated in this manner, dissolves more readily and when boiled up, remains soft and pliable after cooling in the starch vat in the same way as wheat starch; while the corn and potato starch, not so treated, becomes gelatinous or lumpy. The addition of the soluble oil does not appreciably alter the appearance of dry starch, but simply gives it a somewhat smoother feel. The starch thus prepared can be handled in the same manner as the wheat starch and is suitable for all purposes for which starches are used in laundrying, is considerably cheaper than wheat starch, and may be packed for retail use in paper packages in the same manner as dry starch containing no oil.

I claim:—

1. The herein described process of rendering certain starches more penetrating, consisting in treating the dry starch with a salt of a sulfonated fatty acid.

2. The herein described process of rendering starches more penetrating, consisting in treating the dry starch with Turkey red oil.

3. The herein described composition of matter consisting of a mixture of dry corn starch—100 parts and Turkey red oil—2 parts.

4. A dry starch for laundry purposes, containing a salt of a sulfonated fatty acid adapted to increase its penetrating and dissolving qualities, such starch being ready for dissolving in water and use without other additions.

Signed at New York, in the county of New York and State of New York this 24th day of June A. D. 1908.

EDWARD WEINGÄRTNER.

Witnesses:
 FREDERICK. DITTLER,
 A. F. VOIGT.